United States Patent
Gundlach et al.

(10) Patent No.: US 6,418,208 B1
(45) Date of Patent: Jul. 9, 2002

(54) METHOD FOR CONTROLLING THE STATUTORY MONITORING OF TELECOMMUNICATION TRAFFIC

(75) Inventors: Michael Gundlach; Andreas Morgenroth, both of Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/374,896

(22) Filed: Aug. 13, 1999

Related U.S. Application Data

(63) Continuation of application No. PCT/DE98/00022, filed on Jan. 7, 1998.

(30) Foreign Application Priority Data

Feb. 13, 1997 (DE) .......................................... 197 05 505

(51) Int. Cl.[7] .............................................. H04M 15/00
(52) U.S. Cl. ......................................... 379/133; 379/35
(58) Field of Search .................................. 379/133, 134, 379/137, 138, 139, 113, 35, 34, 112, 112.01, 111

(56) References Cited

U.S. PATENT DOCUMENTS 5,799,061 A * 8/1998 Melcher et al. ................ 379/45
5,825,769 A * 10/1998 O'Reilly et al. ............ 379/112

FOREIGN PATENT DOCUMENTS

| DE | 196 17353.1 | 5/1995 |
| DE | 196 38 970.4 | 5/1995 |
| FR | 2 712 131 A1 | 5/1995 |

\* cited by examiner

*Primary Examiner*—Binh Tieu
*Assistant Examiner*—Rexford Barnie
(74) *Attorney, Agent, or Firm*—Herbert L. Lerner; Laurence A. Greenberg; Werner H. Stemer

(57) ABSTRACT

In order to control the statutory monitoring of telecommunication traffic, provision is made in a network component essential for this monitoring of a data base in which it is stored for subscribers to be monitored which communication-relevant data are to be transmitted to one or more relevant monitoring authorities. Monitoring profiles are also defined for the purpose of simplification.

2 Claims, 1 Drawing Sheet

```
User xyz:

Relevant authority A
    a       b       c       d       ...
    0       1       1       0       ...

Relevant authority B
    a       b       c       d       ...
    1       1       1       1       ...
```

Memory

METHOD FOR CONTROLLING THE STATUTORY MONITORING OF TELECOMMUNICATION TRAFFIC

CROSS REFERENCE TO RELATED APPLICATION

This application is a continuation of International Application PCT/DE98/00022, filed Jan. 7, 1998, which designated the United States.

BACKGROUND OF THE INVENTION

Field of the Invention

National (for example G10 Law, telecommunications monitoring regulations, and telecommunications law) and international laws require operators of a public (in future probably also of a private) network to make technical preparation to permit relevant authorities (i.e. law enforcement and secret service) to monitor the telecommunication traffic of suspicious persons in accordance with statutory regulations. The monitoring must be performed in conventional fixed networks just as in, for example, mobile networks and intelligent networks. In the case of the classical telephone services in the fixed network, the appropriate subscriber data record is marked for this purpose in the local exchange of the subscriber to be monitored, and a type of conference service is set up to the relevant authority.

One or more items of the following data are to be transmitted to the relevant authorities depending on the national legislation (the following list lays no claim to completeness):

a content of the communication;

a call number of the calling party;

an intelligent network number of the calling party;

a location of the calling party (for example in the case of mobile radio);

a calling number of the called party;

an intelligent network number of the called party;

a location of the called party (for example in the case of mobile radio);

the time of the start of the communication;

the time of the end of the communication;

a duration of the communication; and the services used.

For reasons of data protection, but also because of performance, no more data should be transmitted to the relevant authority than necessary. The selection of the data which is necessary and/or can be authorized can vary, depending on the reasons for the monitoring, on the gravity of suspicion against the monitored party, or on the type of relevant authority. For example, a two-stage procedure is prescribed in the USA, firstly only the call data is communicated, and the transmitted content of the communication are not communicated until after a further decision by the official party. Furthermore, there are different national provisions according to which, for example, the relevant authority is informed only in the event of a successful call set-up or else, for example, if the line is engaged or when the handset is not picked up. It is also possible that only specific type of services, for example only data services, are to be monitored.

The solutions to date are static, that is to say it is not possible to make a case-specific selection from the data transmitted to the relevant authority. The invention aims at a different solution, which permits a case-specific selection from the data to be transmitted to the relevant authority.

SUMMARY OF THE INVENTION

It is accordingly an object of the invention to provide a method for controlling the statutory monitoring of telecommunication traffic that overcomes the above-mentioned disadvantages of the prior art methods of this general type. With the foregoing and other objects in view there is provided, in accordance with the invention, a method for controlling a statutory monitoring of telecommunication traffic, which includes providing in a network component a data base storing information determining which communication-relevant data are to be transmitted to relevant monitoring authorities for subscribers to be monitored.

In accordance with a concomitant feature of the invention there are the steps of defining monitoring profiles stipulating in each case which of the communication-relevant data are to be transmitted to which relevant monitoring authority of the relevant monitoring authorities; and storing for a subscriber to be monitored one monitoring profile valid for different relevant monitoring authorities.

In the alternative one can store for the subscriber to be monitored a plurality of the monitoring profiles valid for the different relevant monitoring authorities.

Other features which are considered as characteristic for the invention are set forth in the appended claims.

Although the invention is described herein as embodied in a method for controlling the statutory monitoring of telecommunication traffic, it is nevertheless not intended to be limited to the details discussed, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DESCRIPTION OF THE PREFERRED EMBODIMENTS

Figure 1:
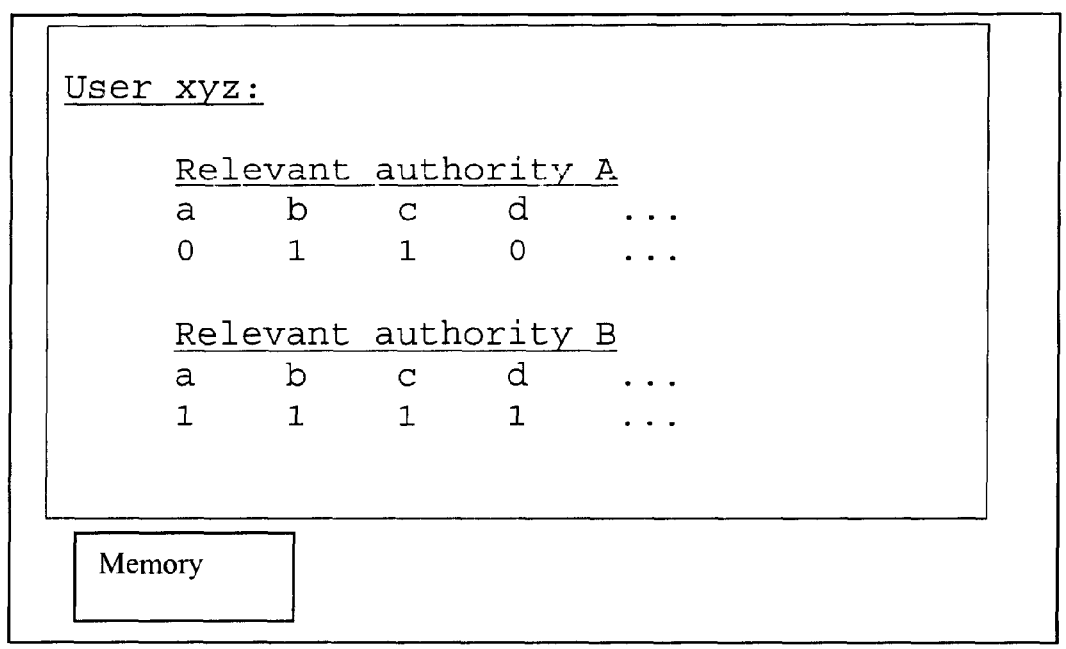
FIG. 1 shows a table stored in memory.

In a method for controlling a statutory monitoring of telecommunication traffic, necessary control features are stored in a database of an essential network component (for example an exchange, a service control point (SCP), and/or a home location register (HLR)), for each subscriber to be monitored and for each relevant authority monitoring him, which data in which cases are to be communicated to the relevant authority. This can be done in the form of a table, as represented by table 1 illustrated in FIG. 1.

FIG. 1 is a table illustrating how the Scope of Monitoring can be stored in a Network Component (for example the exchange, the service control point (SCP), and/or the home location register (HLR)).

The following legend is applicable to the table shown in FIG. 1 c=1: the call number of the communication partner is to be communicated; and d=1: the number of the communication partner is to be communicated.

As an alternative, it is also possible to define a few monitoring profiles that contain typical combinations of different types of monitoring. Possible profiles are represented in Table 2. In this case, only the monitoring profile needs to be specified in each case in the network component.

TABLE 2

Monitoring Profiles

Profile 1:

| a | b | c | d |     |
|---|---|---|---|-----|
| 0 | 0 | 1 | 0 | ... |

Profile 2:

| a | b | c | d |     |
|---|---|---|---|-----|
| 1 | 0 | 1 | 0 | ... |

Profile 3:

| a | b | c | d |     |
|---|---|---|---|-----|
| 1 | 1 | 1 | 1 | ... |

Legend
- $a=1$: the communication content is to be communicated,
- $b=1$: the type of service used is to be communicated,
- $c=1$: the call number of the communication partner is to be communicated, and
- $d=1$: the intelligent network number of the communication partner is to be communicated.

Before being relayed to the relevant authority, the data determined during a monitoring measure in the network component are filtered in accordance with the stored scope of monitoring or the monitoring profile, and only the data required are communicated to the relevant authorities.

In the case of mobile networks and intelligent networks, the scope of monitoring or the monitoring profile must be relayed if necessary from the relevant database (that is to say, for example, from the HLR or SCP) to the exchange, stored there temporarily and evaluated before transmission of data to the relevant authorities. The person skilled in the art may gather the fundamentals for realizing the present invention in these cases from Published, Non-Prosecuted German Patent Applications DE 196 38 970.4 and DE 196 17 353.1.

We claim:

1. A method for controlling a statutory monitoring of telecommunication traffic, which comprises:

defining relevant monitoring authorities for monitoring subscribers such that the relevant monitoring authorities are entities other than the subscribers to be monitored;

providing, in a network component, a data base storing information determining which communication-relevant data are to be transmitted to the relevant monitoring authorities for the subscribers to be monitored;

defining monitoring profiles stipulating in each case which of the communication-relevant data are to be transmitted to which relevant monitoring authority of the relevant monitoring authorities; and storing, for a subscriber to be monitored, data selected from the group consisting of one of the monitoring profiles that is valid for different ones of the relevant monitoring authorities and a plurality of the monitoring profiles, each one of the plurality of the monitoring profiles applicable to at least one of the monitoring authorities.

2. The method according to claim 1, which comprises selecting the relevant monitoring authorities from the group consisting of law enforcement authorities and secret service authorities.

* * * * *